Aug. 1, 1950  L. GREER  2,517,105
FIELD COIL FOR DYNAMOELECTRIC MACHINES
Filed March 14, 1947

Inventor
Lanier Greer,
by Crowell & Mack
His Attorney.

Patented Aug. 1, 1950

2,517,105

UNITED STATES PATENT OFFICE 2,517,105

FIELD COIL FOR DYNAMOELECTRIC MACHINES

Lanier Greer, Erie, Pa., assignor to General Electric Company, a corporation of New York Application March 14, 1947, Serial No. 734,798

2 Claims. (Cl. 171—252)

My invention relates to field coils for salient pole dynamoelectric machines, and more particularly to field coils having preformed configuration and to a method of manufacturing the same.

One of the primary objects in the manufacture and application of dynamoelectric machines, particularly with reference to the traction motor field, has been to increase the power rating of such motors without corresponding increase in physical size or weight. Stated in another way, this means the reduction in size, weight and manufacturing expense without resulting in any sacrifice of power rating or motor efficiency. In order to build a compact, high output traction motor, it is necessary to make the most economical use of available space in the stator structure and at the same time provide motor parts, such as field coils and pole pieces, that are readily removable for serving and replacement.

Large savings in manufacturing cost of dynamoelectric machines have been effected through the use of fabricated frames, such as rolled steel circular stator frames instead of the previously used cast frames of square or octagonal construction. The rolled circular frame gives a rugged compact machine while not sacrificing performance; however, it introduces the problem of space available for mounting of the field poles and coils, resulting in inefficient utilization of space and decreased heat dissipation in the stator unless the field coils are designed and preformed in manufacture to closely fit the field pole and the curved inner surface of the field frame.

It is, therefore, an object of my invention to provide an improved field coil construction for salient pole dynamoelectric machines.

It is a further object of my invention to provide an improved field coil construction which is simple in construction and which may be economically manufactured.

It is another object of my invention to provide an improved method of construction for traction motor field coils in which the coil is formed and shaped during manufacture to make optimum use of all available space in the motor frame.

Another object of my invention consists in an improved method for winding, assembling and machining to shape the field coils for dynamoelectric machines.

Figure 1:
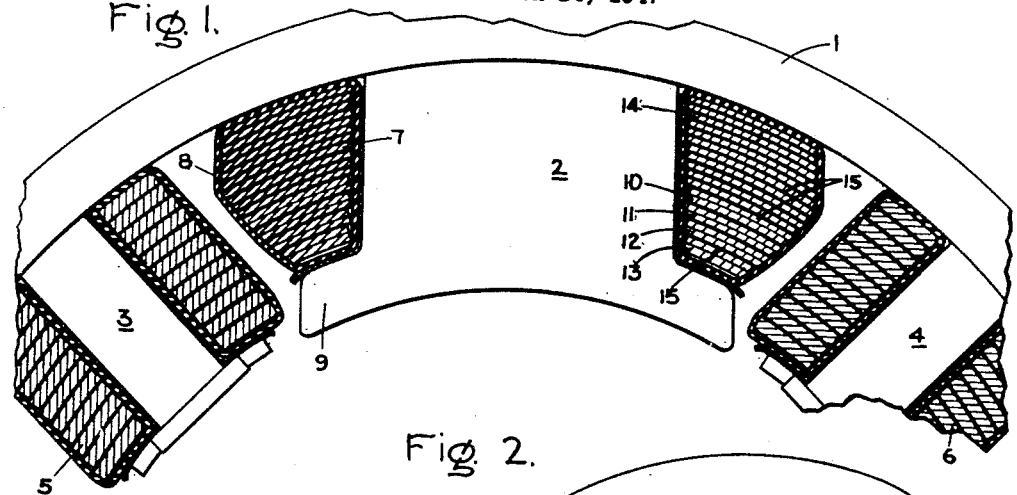
Figure 2:
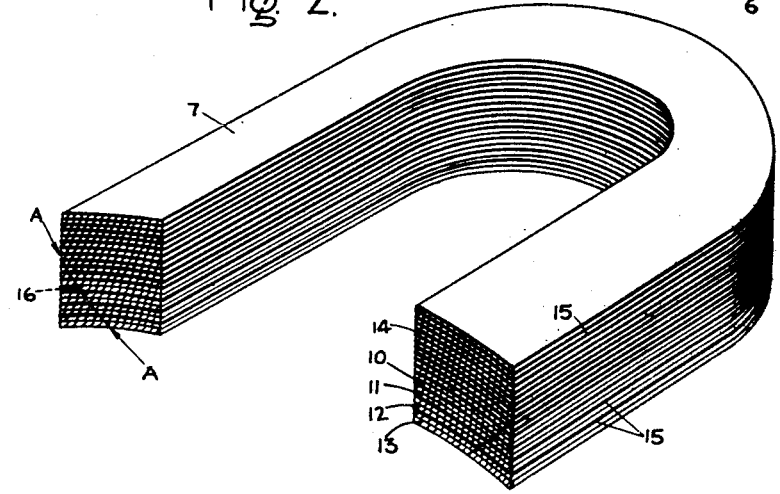
Figure 3:
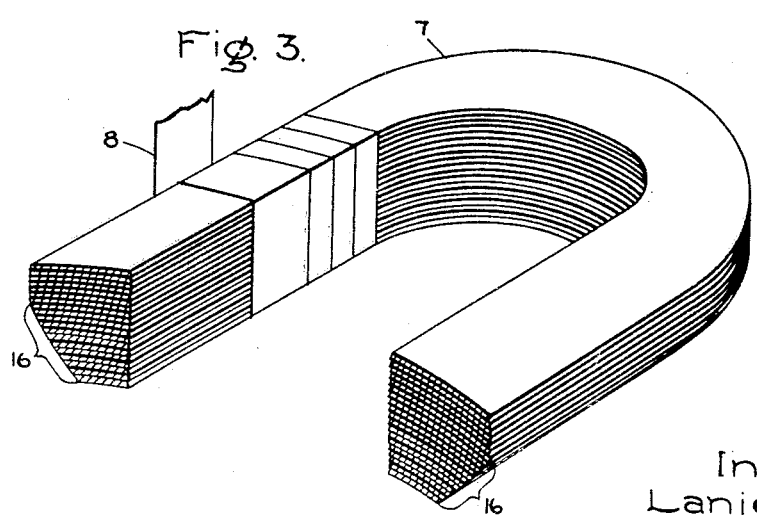

My invention will be better understood by reference to the following detailed description taken in connection with the accompanying drawing, in which like reference numerals have been applied to corresponding parts of the various figures thereof. In the drawing, Fig. 1 represents a cross-sectional view of a portion of the field structure of a salient pole dynamoelectric machine showing my improved field coil mounted in place; Fig. 2 is a perspective view in cross section of my field coil after the winding and forming operations, and Fig. 3 is also a perspective view in cross section of the coil of Fig. 2 after the outer coil surface has been machined to shape.

Referring to Fig. 1, I have shown a portion of a field frame 1 of a dynamoelectric machine, for example, the circular rolled steel field frame of a direct current traction motor. Securely mounted to the frame 1 is the main exciting field coil pole piece 2 and auxiliary pole pieces 3 and 4 of smaller dimensions and which may be interpoles or commutating poles for the direct current motor. The interpoles 3 and 4, as shown, are provided with conventional field coils 5 and 6, respectively, and are shown mainly to emphasize the space limitations which are encountered in the design and assembly of the main exciting field coil, indicated generally at 7. It will, of course, be understood that my improved field coil construction is applicable to interpole or commutating field pole coils as well.

As viewed in Fig. 1, it will be noted that the exciting field coil 7 comprises a plurality of continuous turns of flat copper strip, each turn being insulated from the adjacent turns, and securely wrapped with the necessary layers of insulating material or tape 8. It should be particularly noted that since the field coil 7 is tapered toward the pole face 9 over the inner portion of its surface nearest the poleface, its cross-sectional area decreases and in order to maintain the equivalent cross-sectional area of conducting material throughout the entire length of the coil, a number of the inner turns represented by 10, 11, 12, and 13 are formed of increased thickness of copper strip, such as the two-ply or double thickness strip shown, whereas on the outer coil side, near the motor frame 1, the coil is formed of a single strip 14. Each turn of the coil is insulated from adjacent turns by layers of insulating material 15. The construction of the coil in the early stages of manufacture is shown in Fig. 2 in which it will be noted that the top turns of the coil corresponding to those nearest the field frame 1 are alternate layers of insulation 15 and copper strip 14, whereas the inner turns 10, 11, 12, and 13 are comprised of double thickness copper strip or two-ply copper strip suitably connected to the single thickness turns, which are, in turn, separated by similar insulating layers 15.

In the manufacture of the field coil, the flat copper strip is edgewise wound in a conventional manner upon a form corresponding in shape to the pole piece to which the coil will be applied. After the flat coil has been wound, it is then placed in a forming press and subjected to sufficient pressure to form the entire coil to fit the concave or circular shape of the stator frame 1.

The formed coil is then securely clamped by means of a clamp extending through the central opening and placed on a suitable milling machine, and the excess material at the outer edges 16 of the pole face end of the coil removed by milling along the sides only or around the entire periphery of the coil, the milling cut being made along the line A—A in Fig. 2. The appearance of the finished coil with insulation 15 between turns but before ground insulation is applied and after the milling operation is shown in Fig. 3. From this it will be evident that the outer surface 16 may be milled to the shape or contour best adapted for fitting between the interpole coils 5 and 6 as shown in Fig. 1. The contoured surface 16 may be made slightly convex, as shown in Fig. 3, in which case a contoured cutter could be used in the milling operation, or the surface 16 may be formed entirely flat in which case a straight milling cut may be taken along the lines A—A of Fig. 2. After the coil has been completely formed and the milling operation is completed, any rough or sharp edges remaining on the edges of the turns of coil 7 are removed, and the coil is then in condition for final insulation and wrapping with insulating tape. The electrical insulation of the coil 7 can be accomplished in any desired manner, such as repeated dipping in insulating varnish followed by heat treatment, and in addition the completed coil should be wrapped with an adequate thickness of insulating tape 8 to insure the surface against mechanical damage and probable resultant failure of coil insulation.

By means of this construction and method of manufacture, a number of advantages are obtained. For example, utilization is made of standard rolled copper strip which has superior qualities over the use of cast copper for coils, such as have been used in the past for contoured field coils. The copper strip is uniform both with respect to electrical characteristics and mechanical strength, and is easily worked in the initial edgewise winding operation and in the forming operation. The use of a formed coil of this nature permits the utilization of a cylindrical rolled stator frame which lends itself to economical manufacture as well as reducing size and weight when compared with square or octagonal field frames.

As shown in Fig. 3, the use of a convex machined surface 16 has one advantage over a straight coil side in that it enables the insulating tape to be wound tightly around the coil, thus eliminating entrapped air which is nearly always included in taping a long flat surface. The heat transmission and radiation characteristics of the preformed coil are better than the conventional coil because of the elimination of air spaces between insulation and coil, also, a large portion of the surface of the insulated coil is in intimate contact with the pole piece 2 and with the inner surface of the cylindrical stator frame 1.

While I have shown and described my invention as applied to a particular system and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. A field coil for a cylindrical frame salient pole dynamoelectric machine comprising, a plurality of continuous turns of flat strip conductor shaped to fit said salient pole, the outermost turns adjacent the frame being comprised of single thickness conductor and the innermost turns adjacent the pole tip of said salient pole being comprised of double thickness strip conductor, said double thickness turns decreasing progressively in width toward said pole face, said coil having an arcuate configuration adapted to fit closely to the inner surfaces of said frame and said pole tip, and means for electrically insulating each turn of said coil from each adjacent turn and from said frame and said salient pole.

2. A field coil for a cylindrical stator frame salient pole dynamoelectric machine comprising, a plurality of continuous turns of flat strip conductor, the outermost turns adjacent the stator frame being comprised of single thickness conductor and the innermost turns adjacent the pole tip of said salient pole being comprised of increased thickness strip conductor, said coil having an arcuate configuration adapted to fit closely to the inner surfaces of said stator frame and said pole tip and having a tapered outer surface on the inner end of said coil substantially coextensive with the portion of said coil formed of increased thickness strip conductor, whereby said pole face end of said coil has a diameter less than said stator end of said coil, and electrical insulation disposed between each turn of said coil and between said coil and said stator frame and pole piece.

LANIER GREER.

REFERENCES CITED

The following references are of record in the file of this patent:

UNITED STATES PATENTS

| Number | Name | Date |
|--------|------|------|
| 359,205 | Curtis et al. | Mar. 8, 1887 |
| 744,018 | Aiken | Nov. 17, 1903 |
| 912,551 | Field | Feb. 16, 1909 |
| 975,425 | Hensley | Nov. 15, 1910 |
| 1,300,859 | Nickonow | Apr. 15, 1919 |

Certificate of Correction

Patent No. 2,517,105                                      August 1, 1950

LANIER GREER

It is hereby certified that error appears in the printed specification of the above numbered patent requiring correction as follows:

Column 1, line 20, for the word "serving" read *servicing*;

and that the said Letters Patent should be read as corrected above, so that the same may conform to the record of the case in the Patent Office.

Signed and sealed this 7th day of November, A. D. 1950.

[SEAL]

THOMAS F. MURPHY,
*Assistant Commissioner of Patents.*